US006511252B1

(12) United States Patent
Andros

(10) Patent No.: US 6,511,252 B1
(45) Date of Patent: Jan. 28, 2003

(54) DEVICE AND METHOD FOR CONNECTING CONCRETE PLIES IN PRE-CAST CONCRETE WALL AND CEILING PANELS

(76) Inventor: Chris Andros, 1111 Bayshore Blvd., Unit B-5, Clearwater, FL (US) 33759

( * ) Notice: Subject to any disclaimer, the term of this patent is extended or adjusted under 35 U.S.C. 154(b) by 0 days.

(21) Appl. No.: 09/384,529

(22) Filed: Aug. 27, 1999

Related U.S. Application Data

(60) Provisional application No. 60/098,882, filed on Sep. 2, 1998.

(51) Int. Cl.$^7$ ................................................ F16B 15/00
(52) U.S. Cl. .................. 403/283; 52/309.11; 52/404.2; 44/922
(58) Field of Search ................................ 403/269, 404, 403/283, 24; 52/309.11, 309.12, 309.17, 404.2, 405.1, 414, 700, 742.15, 742.14, DIG. 1; 44/922, 452, 453, 454, 455

(56) References Cited

U.S. PATENT DOCUMENTS

| 576,455 A | 2/1897 | Johnson |
| 1,544,711 A | 7/1925 | Wilson |
| 2,058,020 A | 10/1936 | Jaffe |
| 2,412,744 A | 12/1946 | Nelson |
| 2,575,079 A | 11/1951 | Temple |
| 2,595,123 A | 4/1952 | Callan |
| 2,645,929 A | 7/1953 | Jones |
| 2,653,469 A | 9/1953 | Callan |
| 2,718,138 A | 9/1955 | Jones |
| 2,769,333 A | 11/1956 | Reintjes |
| 2,775,018 A | 12/1956 | McLaughlin |
| 2,964,821 A | 12/1960 | Meehan |
| 3,000,144 A | 9/1961 | Kitson |
| 3,131,514 A | 5/1964 | Siek |
| 3,208,328 A | 9/1965 | Myers |
| 3,304,676 A | 2/1967 | Sallie et al. |
| 3,426,494 A | 2/1969 | Hala |
| 3,523,359 A | 8/1970 | Spikes |
| 3,646,715 A | 3/1972 | Pope |
| 3,701,228 A | 10/1972 | Taylor |
| 3,750,355 A | 8/1973 | Blum |

(List continued on next page.)

FOREIGN PATENT DOCUMENTS

| DE | 2024157 | 12/1971 |
| DE | 2715277 | 10/1978 |
| DE | 3925780 A1 | 2/1991 |

OTHER PUBLICATIONS

Composite Technologies Corporation; Changing the Way the World Builds; (No Date).
Composite Technologies Corporation; Architectural/Engineering Manual; 1990; pp. 1–31.
Composite Technologies Corporation; THERMOMASS®–PIP Building System (No Date).
Owens Corning; PINKCORE™ Extruded Polystyrene Insulation & Connector Ties (No Date).
Journal; Sandwich Wall Panels for Expanded Corporate Offices and Warehouse; Jul.–Aug. 1979; pp. 148–152.
W.E. Yates; Lithweight claddin cuts costs; Dec. 1979.
Paul Juhnke; Tilt–Up Panels—Possible key to low–cost concrete houses; May 1970; pp. 156–157.
Engineering Research Institute; Fully Tested . . . Proven Performance; Sep. 1991.
Forsroc; Preco Precast Division; Forming Accessories.

*Primary Examiner*—Lynne H. Browne
*Assistant Examiner*—John R. Cottingham
(74) *Attorney, Agent, or Firm*—Leydig, Voit & Mayer, Ltd.

(57) ABSTRACT

A connector is disclosed for connecting together plies, or wythes, of pre-cast concrete wall or ceiling panels which have the necessity of being cast in several plies or layers. The connector joins together first and second concrete layers with an intervening insulation layer. Also disclosed is a method for creating these concrete panels using the connector and an insert tool for use in inserting the connector.

4 Claims, 9 Drawing Sheets

U.S. PATENT DOCUMENTS

| | | |
|---|---|---|
| 3,869,219 A | 3/1975 | Wilson et al. |
| 3,879,908 A | 4/1975 | Weismann |
| 3,969,975 A | 7/1976 | Krol |
| 4,018,023 A | 4/1977 | Anderson |
| 4,157,001 A | 6/1979 | Pickles |
| 4,329,821 A | 5/1982 | Long et al. |
| 4,348,847 A | 9/1982 | Jukes |
| 4,393,635 A | 7/1983 | Long |
| 4,545,163 A | 10/1985 | Asselin |
| 4,568,215 A | 2/1986 | Nelson |
| 4,624,089 A | 11/1986 | Dunker |
| 4,702,053 A | 10/1987 | Hibbard |
| 4,805,366 A | 2/1989 | Long |
| 4,829,733 A | 5/1989 | Long |
| 4,846,655 A | 7/1989 | Gulley |
| 4,907,928 A | 3/1990 | Beck et al. |
| 4,932,819 A | 6/1990 | Almeras |
| 4,945,700 A | 8/1990 | Powell |
| 4,948,312 A | 8/1990 | Jochum |
| 4,973,211 A | 11/1990 | Potucek |
| 5,011,354 A | 4/1991 | Brownlee |
| 5,031,378 A | 7/1991 | Murphy |
| 5,094,057 A | 3/1992 | Morris |
| 5,213,170 A * | 5/1993 | Savitski ................. 175/323 |
| 5,265,998 A | 11/1993 | Kluser |
| 5,267,423 A | 12/1993 | Giannuzzi |
| 5,295,767 A * | 3/1994 | Taki ...................... 405/233 |
| 5,317,939 A | 6/1994 | Marinescu |
| 5,476,149 A * | 12/1995 | Rickards ............... 175/388 |
| 5,519,973 A | 5/1996 | Keith et al. |
| 5,606,832 A | 3/1997 | Keith et al. |
| 5,661,938 A | 9/1997 | Ditka et al. |
| 5,673,525 A | 10/1997 | Keith et al. |
| 5,809,723 A | 9/1998 | Keith et al. |
| 5,996,297 A | 12/1999 | Keith et al. |

\* cited by examiner

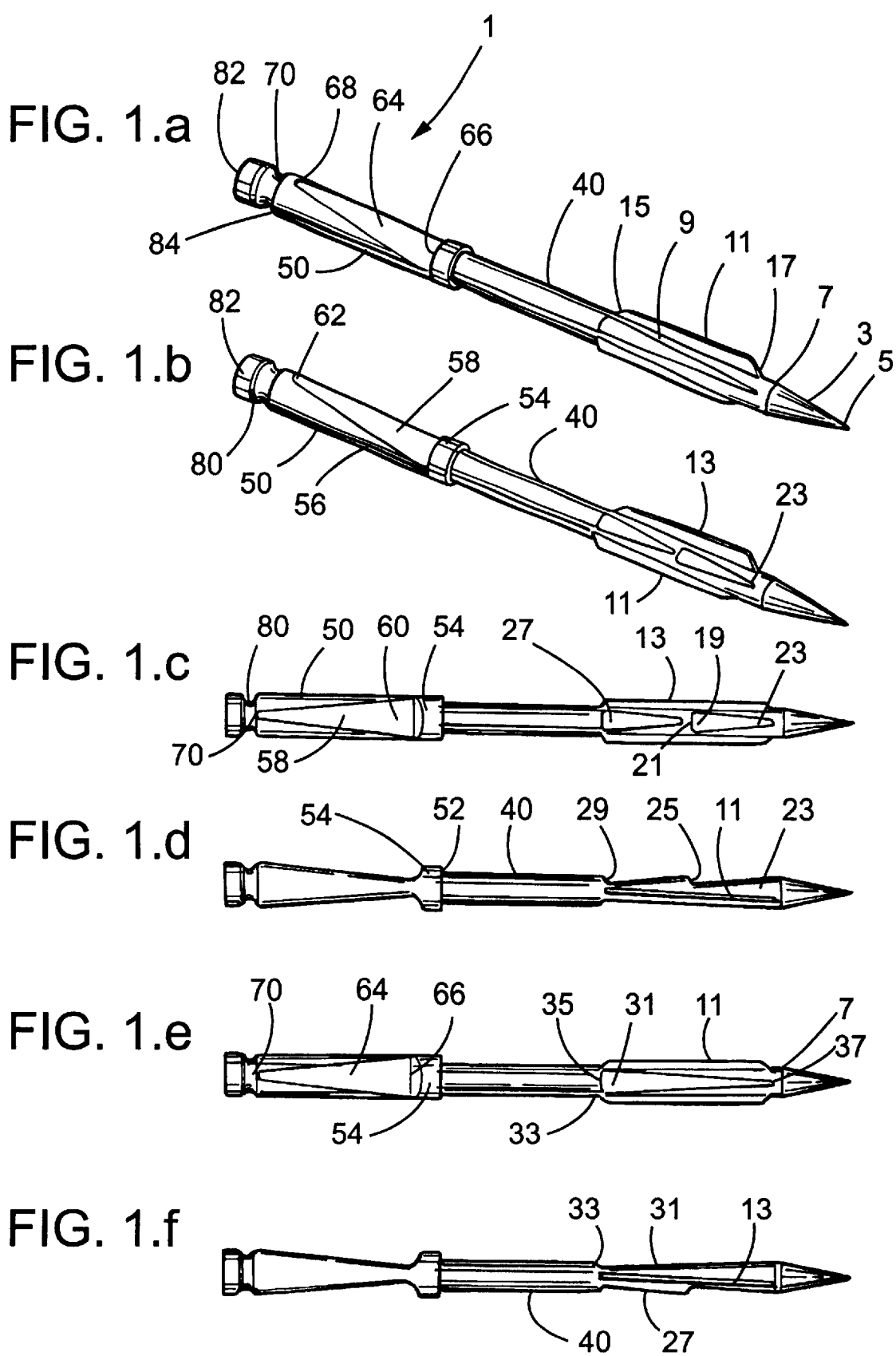

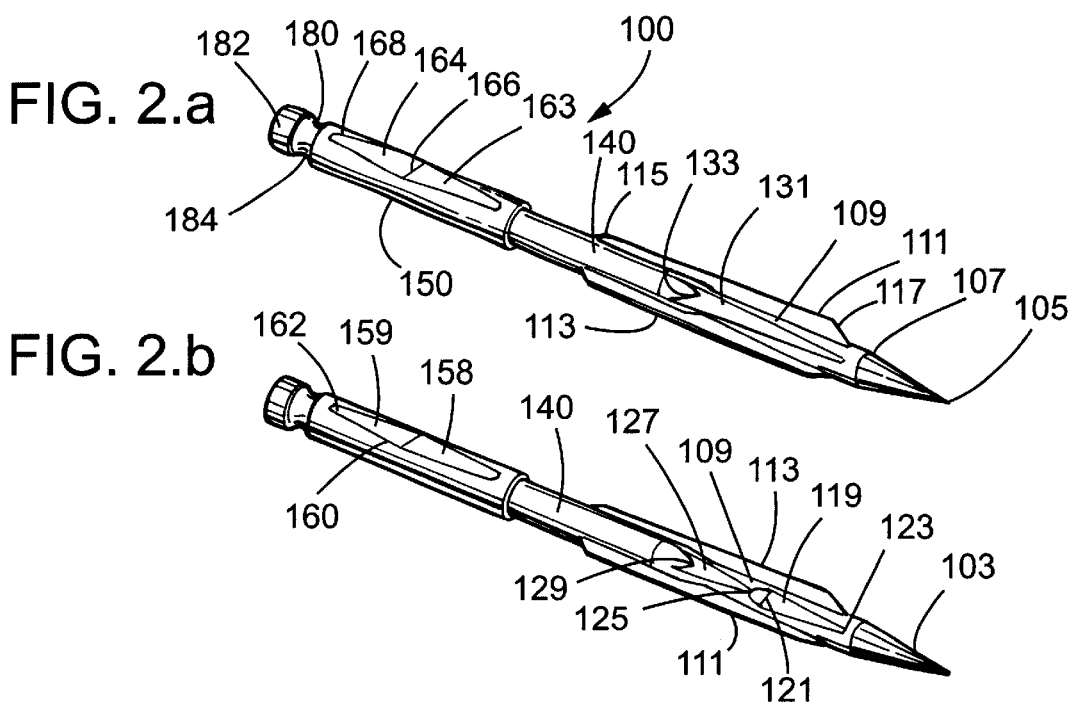
FIG. 2.a
FIG. 2.b
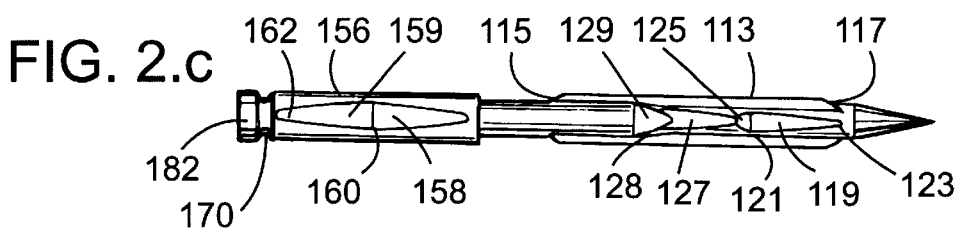
FIG. 2.c
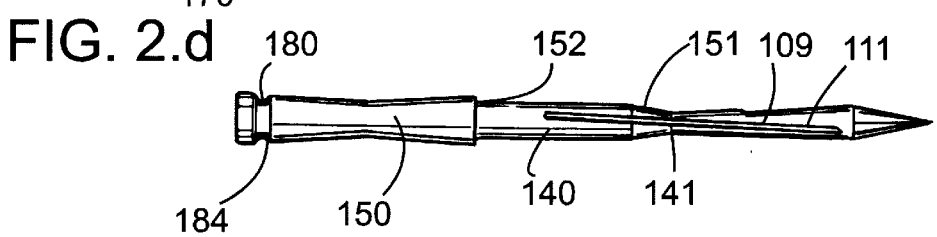
FIG. 2.d
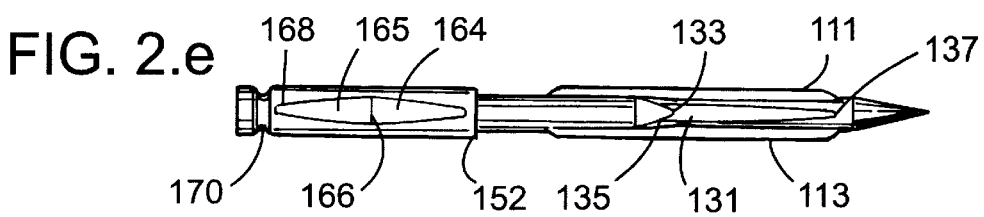
FIG. 2.e
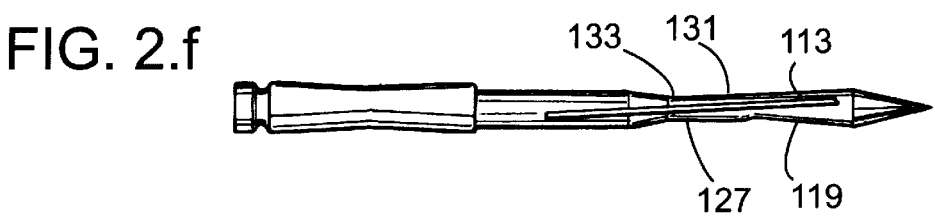
FIG. 2.f

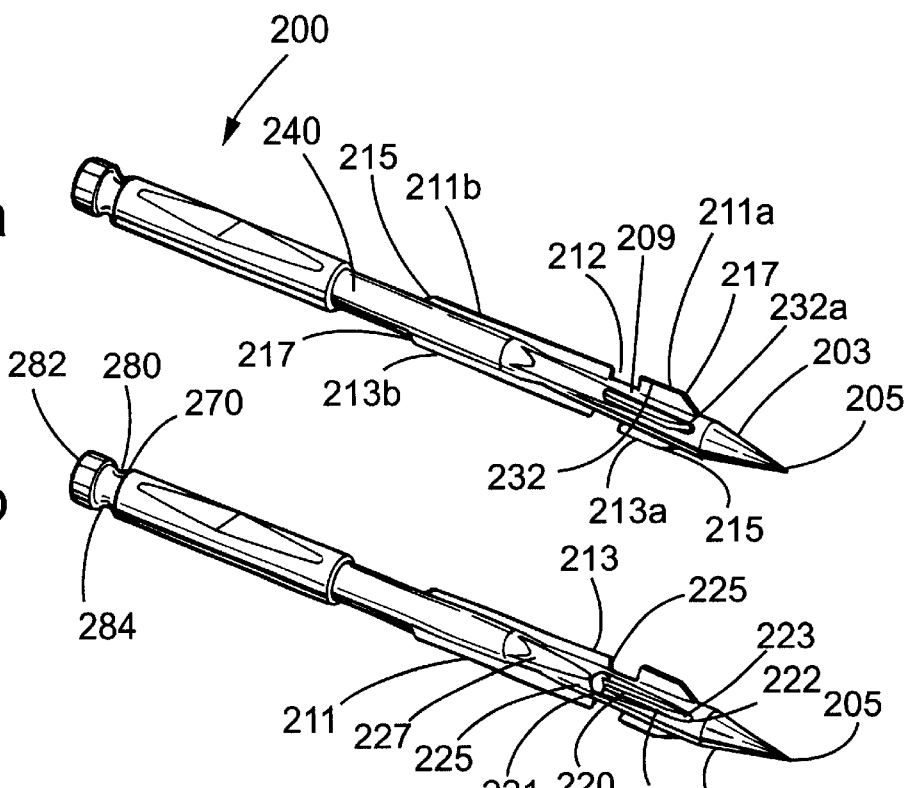
FIG. 3.a
FIG. 3.b
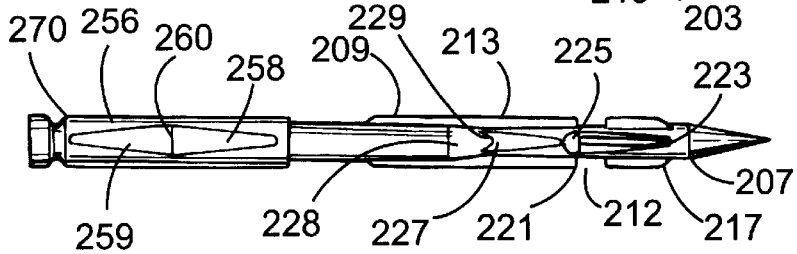
FIG. 3.c
FIG. 3.d
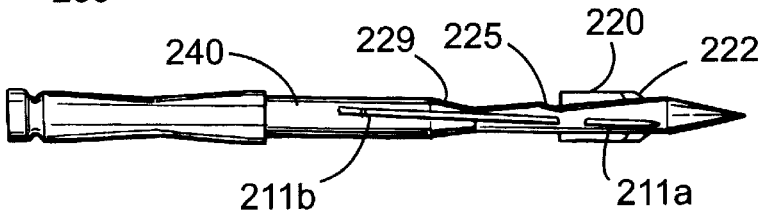
FIG. 3.e
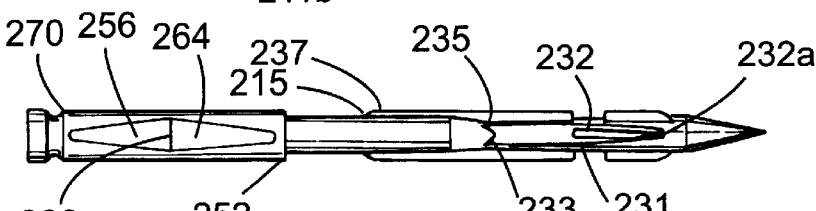
FIG. 3.f
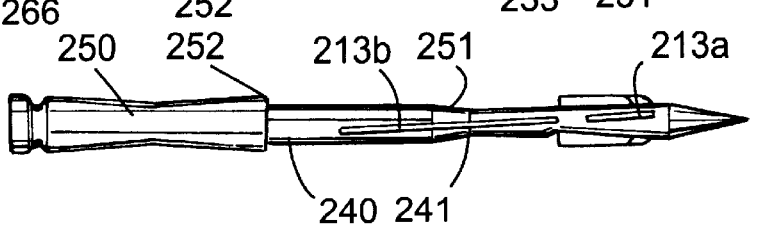

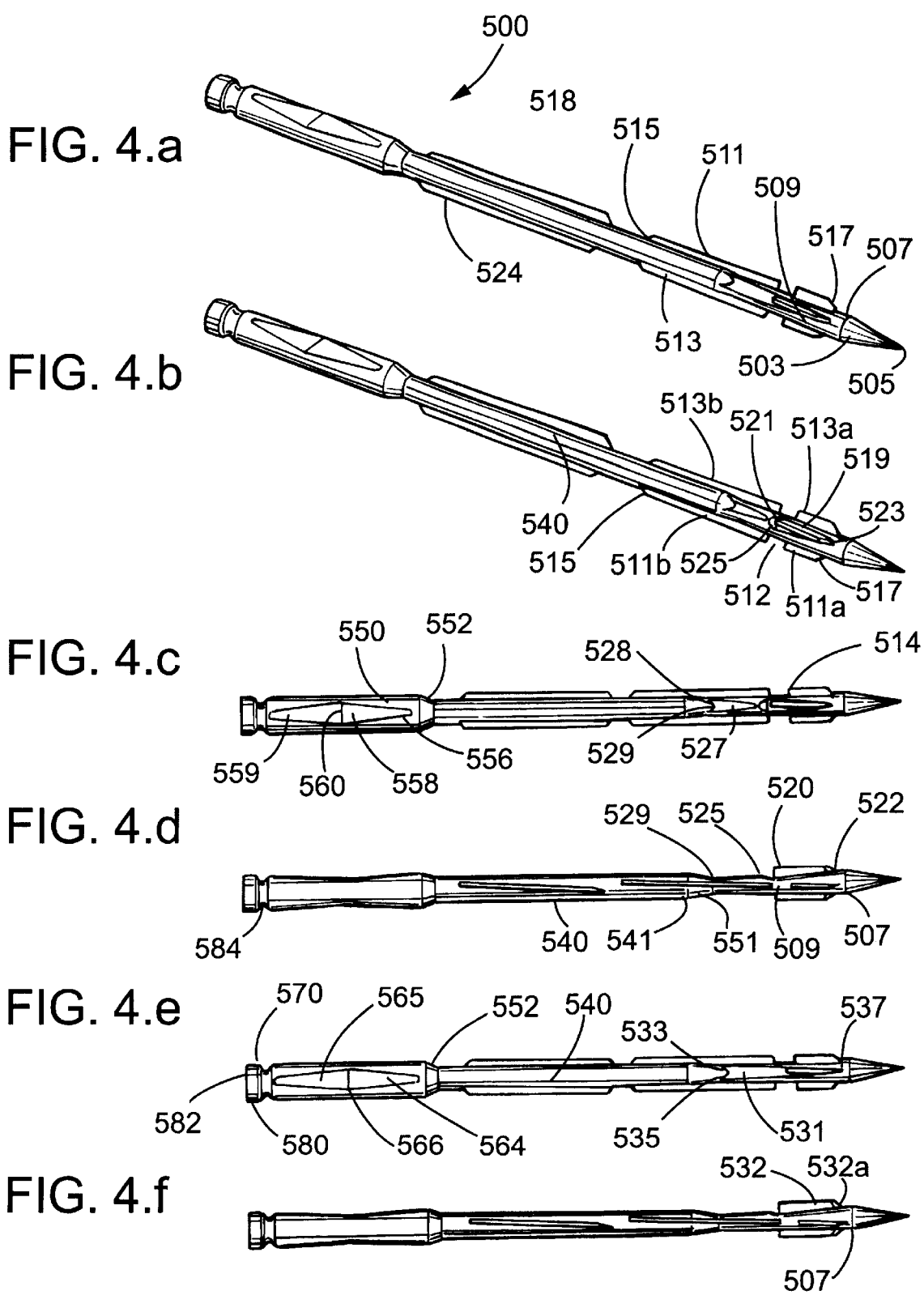

600
FIG. 5.a
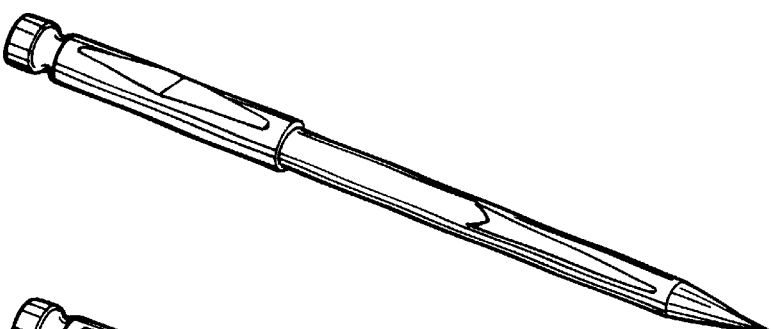
FIG. 5.b
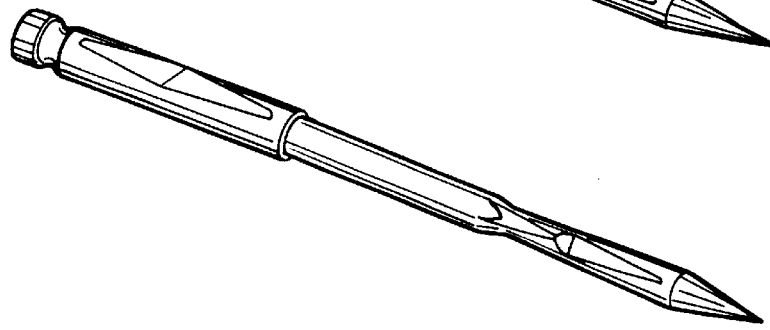
FIG. 5.c
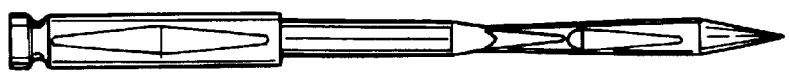
FIG. 5.d
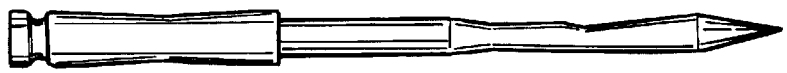
FIG. 5.e
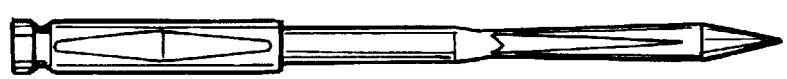
FIG. 5.f
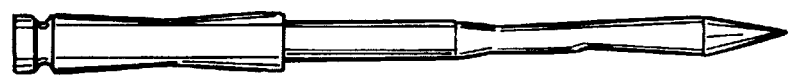

700
FIG. 6.a 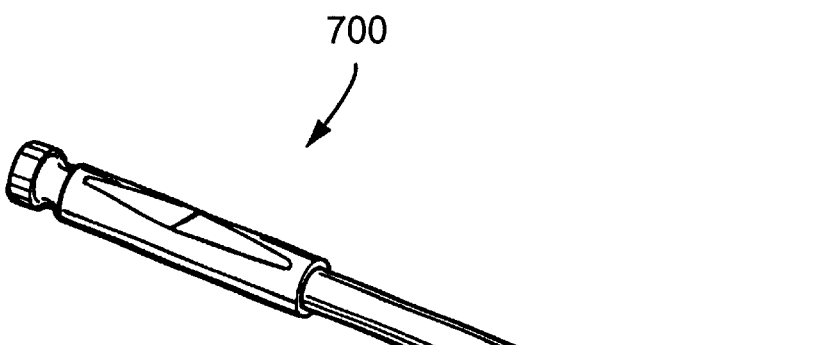
FIG. 6.b 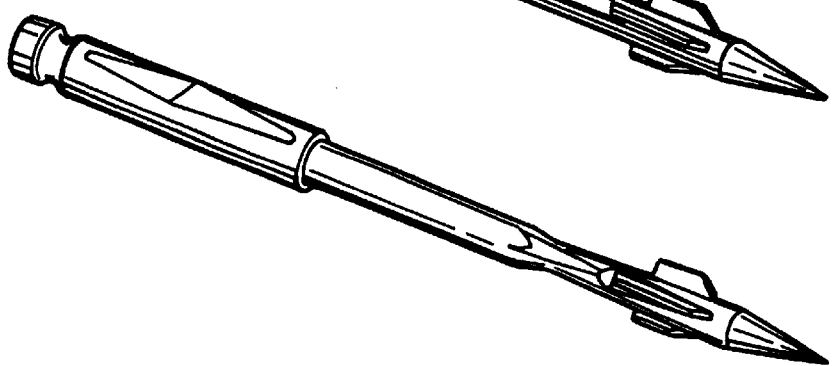
FIG. 6.c 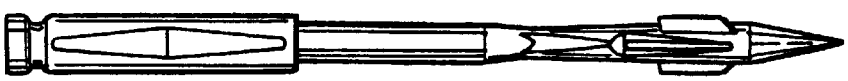
FIG. 6.d 
FIG. 6.e 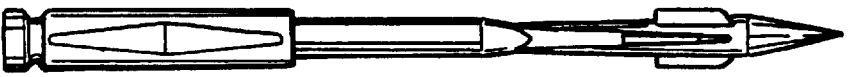
FIG. 6.f 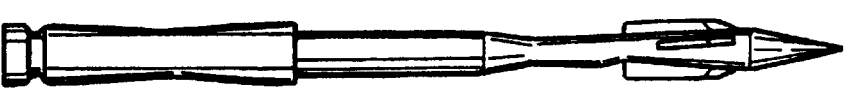

FIG. 8.a    FIG. 8.b
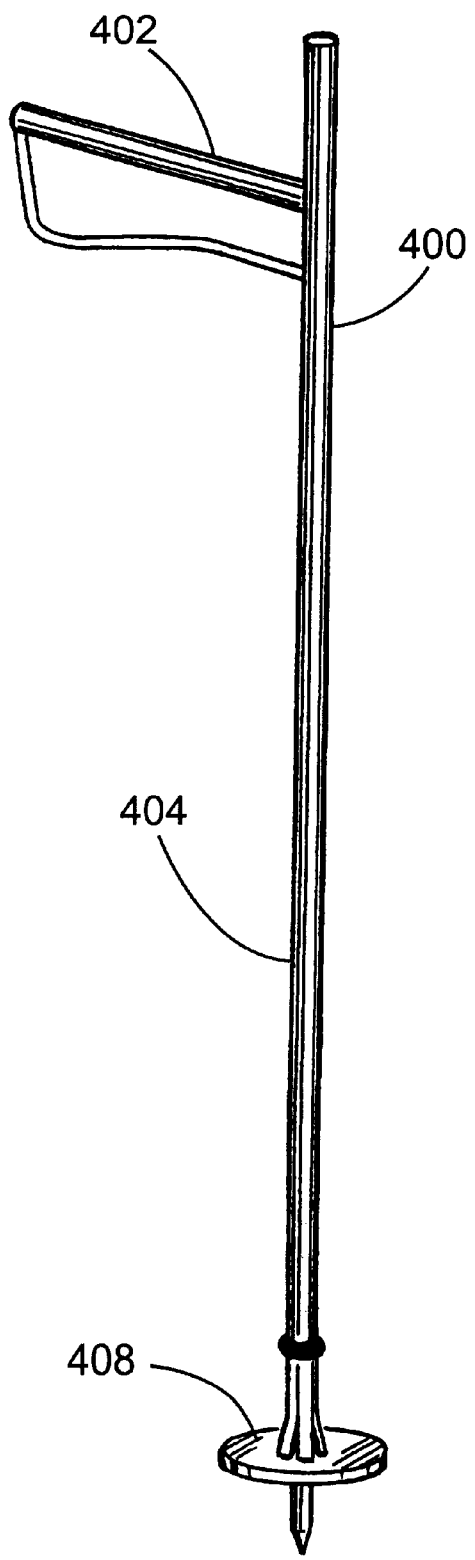
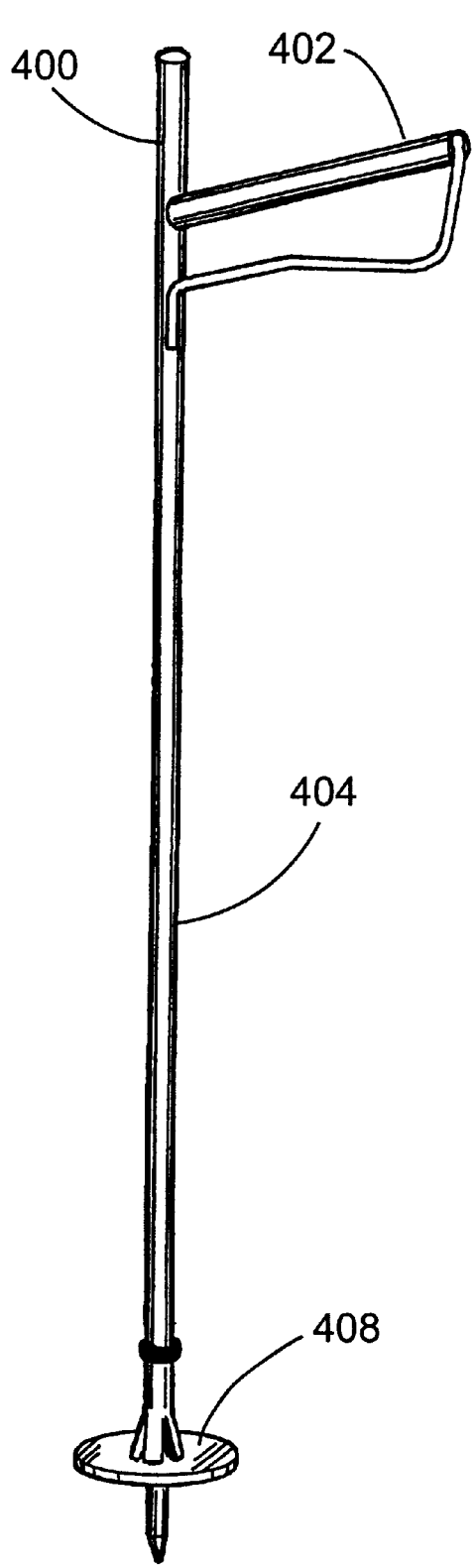

DEVICE AND METHOD FOR CONNECTING CONCRETE PLIES IN PRE-CAST CONCRETE WALL AND CEILING PANELS

FIELD OF THE INVENTION

This application is a continuation-in-part of my prior provisional patent application Ser. No. 60/098,882 filed Sep. 2, 1998, the disclosure of which is incorporated herein in its entirety. This invention relates generally to connectors for constructing laminated pre-cast concrete walls and ceilings where it is desirable to incorporate a layer of insulation within the wall or ceiling. Further, the invention relates to a method of constructing such a laminated pre-cast wall or ceiling and an insertion device for use in practicing the method.

BACKGROUND OF THE INVENTION

Large buildings, especially warehouses or other such buildings having large wall and ceiling expanses, often make use of walls or ceilings constructed on location. These walls may be made from concrete block. However, such concrete block walls are time consuming to build and are highly labor intensive. To speed construction and lower costs, the walls may be constructed of reinforced concrete which is poured directly in the place where a wall is desired. However, such walls generally may only be poured to controlled heights and widths and require the use of expensive forming methods. Further, to insulate concrete block walls and poured in place walls, it is necessary to apply the insulation to the interior of the wall and to then frame around the insulation to form an interior wall which maintains the insulation in place while at the same time protecting the insulation and hiding it from general view.

To speed construction and lower costs, builders have resorted to walls which are poured flat on the ground, either on-site or at offsite locations. Likewise, concrete ceiling panels may be poured at ground level either on-site or at manufacturing facilities. These ceiling and wall panels are then lifted or tilted into place.

As energy costs have risen and the costs to heat and/or cool buildings has increased, the need to insulate buildings has increased dramatically. The principal solution to this need to insulate large wall and ceiling expanses in an esthetic manner has been the development of manufacturing wall sections in several plies. The lamination, or amalgamation of wythes or layers, generally consists of an outer non-structural concrete layer of minimal thickness next to which is placed an insulating board of the desired thermal barrier thickness. This lamination is then completed by the addition of a final concrete layer which is generally much thicker and steel reinforced. The added final ply thickness is the element that supports the wall section and incorporates it into the intended structure. To prohibit delamination, the several wythes or layers must somehow be fastened together into a solid immobile unit.

Previously, the fasteners used to connect the three layers have been rudimentary requiring intensive manual labor for insertion or use. Currently available commercial products require specially prepared insulating board materials that must be used in conjunction with their devices which are pre-drilled or pre-formed with the necessary holes through which the prior art connectors are inserted. Generally, the connectors and pre-holed insulation panels are sold by a common manufacturer which limits the user to a single source, generally higher priced, supplier.

The manufacture of such a wall typically is performed on a horizontal casting bed, some other firm flat surface, or the concrete floor of the building it is intended to be part of. The first operation is to cast a thin layer, or concrete wythe, of the panel within the containing formwork. While the concrete is still wet and in a soft plastic state an insulating board which has prearranged holes spaced in repeating order is quickly placed over the wet concrete. Construction workers then proceed to insert the prior-art connecting devices through the holes in the insulating board and into the lower concrete layer while leaving a portion of the connector standing above the insulating board.

The insertion of the prior art connectors requires much manipulation and working by the workers because of the connector's construction. Further, after insertion, it is generally considered necessary for the workers to return to each inserted connector and to manually hand rotate 90°, after full insertion through the insulation board, each connector. The purpose of the rotation is to embed the connector in the wet concrete below. The consistency of insertion is impaired by the inevitable variations that occur when the workers repeat this operation thousands of times for a given number of wall panels in a building. The human factor alone contributes to inconsistent results. To make embedment fully effective most all current systems compound the potential for variation of results by recommending that the workers walk over the entire surface of the insulating board. This is done to force the wet concrete into recesses in the connecting devices for fuller envelopment of the connector stem in the wet concrete.

SUMMARY OF THE INVENTION

A connector is provided for use in forming a three ply concrete-insulation-concrete panel. The connector comprises a generally rod-shaped member having at least one angular fin extending from the rod causing the connector to rotate during insertion of the connector into the insulation layer and the first concrete layer. The connector preferably is generally rod shaped and includes three distinct segments. The first segment includes a pointed terminal end. Preferably, the first segment further includes two of angular fins spaced on opposite sides of the first segment. Even more preferably, the first segment includes four angular fins spaced about the circumference of the first segment.

The first segment further preferably includes at least one flat area spaced approximately 90° around the exterior circumference of said first segment from one of the fins. The connector also preferably further includes at least one flat area spaced approximately 270° around the exterior circumference of the first segment from one of said fins. More preferably, the at least one flat area spaced approximately 270° around the exterior circumference of the first segment from one of the fins comprises two flat acutely shaped triangular areas.

A connector is also provided for use in forming a three ply concrete-insulation-concrete panel where the connector is formed of glass filled nylon. The connector includes a first pointed end having sufficient sharpness to permit perforation of insulation board without the separation and displacement of an insulation plug.

A connector is also provided for use in forming a three ply concrete-insulation-concrete panel which comprises a generally rod-shaped member having a first end forming a sharpened point, a first body segment including four circumferentially spaced angled fins, a second body segment including at least two circumferentially spaced angled fins, and a third body segment having at least two circumferentially spaced flat segments. The connector preferably includes four circumferentially spaced angled fins on the second body segment and the connector is preferably formed from glass filled nylon.

A method of forming a multiply ceiling or wall panel is also provided. In the method, a first concrete face ply is poured at grade level. Unperforated insulation board is arranged on the uncured first concrete face ply in any desired arrangement. The insulation board is then perforated with a connector which passes through the insulation board and into the first concrete face ply such that a portion of the connector extends above the surface of the insulation board. A second concrete structural ply is then poured over the insulation board to engage the connector. In practicing this method, preferably, the connector comprises a generally rod-shaped member having at least one angular fin extending from the rod causing the connector to rotate during insertion of the connector into the insulation layer and the first concrete layer. The generally rod shaped member preferably includes three distinct segments of which the first segment of includes at least two angular fins, and more preferably four angular fins, evenly spaced about the first segment.

Preferably, in practicing the method, the connector is inserted into the insulation board using an insertion tool which releasably maintains the connector in an insertion position.

An insertion tool for inserting a connector into an unperforated insulation board is also provided. The insertion tool comprises a handle, a barrel, and a tubular holder for holding the connector in a releasable position. The insertion tool tubular holder preferably includes means for maintaining the connector within the insertion tool until release is desired. Preferably, the means for maintaining the connector within the insertion tool until release is desired comprises a spring. Also preferably, the insertion tool barrel is of sufficient length to permit insertion of the connector by a man in a standing position.

BRIEF DESCRIPTION OF THE DRAWINGS

FIG. 1a shows a perspective view of a first embodiment of a connector according to the present invention.

FIG. 1b shows a perspective view of the connector of FIG. 1a, the connector having been rotated 180° about its long axis.

FIG. 1c shows a side view of the connector of FIG. 1a.

FIG. 1d shows a further side view of the connector depicted in FIG. 1c, the connector having been rotated about its long axis 90°.

FIG. 1e shows a further side view of the connector depicted in FIG. 1d, the connector having been rotated about its long axis a further 90°.

FIG. 1f shows a further side view of the connector depicted in FIG. 1e, the connector having been rotated about its long axis a further 90°.

FIG. 2a shows a perspective view of a second embodiment of a connector according to the present invention.

FIG. 2b shows a perspective view of the connector of FIG. 2a, the connector having been rotated 180° about its long axis.

FIG. 2c shows a side view of the connector of FIG. 2a.

FIG. 2d shows a further side view of the connector depicted in FIG. 2c, the connector having been rotated about its long axis 90°.

FIG. 2e shows a further side view of the connector depicted in FIG. 2d, the connector having been rotated about its long axis a further 90°.

FIG. 2f shows a further side view of the connector depicted in FIG. 2e, the connector having been rotated about its long axis a further 90°.

FIG. 3a shows a perspective view of a third embodiment of a connector according to the present invention.

FIG. 3b shows a perspective view of the connector of FIG. 3a, the connector having been rotated 180° about its long axis.

FIG. 3c shows a side view of the connector of FIG. 3a.

FIG. 3d shows a further side view of the connector depicted in FIG. 3c, the connector having been rotated about its long axis 90°.

FIG. 3e shows a further side view of the connector depicted in FIG. 3d, the connector having been rotated about its long axis a further 90°.

FIG. 3f shows a further side view of the connector depicted in FIG. 3e, the connector having been rotated about its long axis a further 90°.

FIG. 4a shows a perspective view of a fourth embodiment of a connector according to the present invention.

FIG. 4b shows a perspective view of the connector of FIG. 4a, the connector having been rotated 180° about its long axis.

FIG. 4c shows a side view of the connector of FIG. 4a.

FIG. 4d shows a further side view of the connector depicted in FIG. 4c, the connector having been rotated about its long axis 90°.

FIG. 4e shows a further side view of the connector depicted in FIG. 4d, the connector having been rotated about its long axis a further 90°.

FIG. 4f shows a further side view of the connector depicted in FIG. 4e, the connector having been rotated about its long axis a further 90°.

FIG. 5a shows a perspective view of a fifth embodiment of a connector according to the present invention.

FIG. 5b shows a perspective view of the connector of FIG. 5a, the connector having been rotated 180° about its long axis.

FIG. 5c shows a side view of the connector of FIG. 5a.

FIG. 5d shows a further side view of the connector depicted in FIG. 5c, the connector having been rotated about its long axis 90°.

FIG. 5e shows a further side view of the connector depicted in FIG. 5d, the connector having been rotated about its long axis a further 90°.

FIG. 5f shows a further side view of the connector depicted in FIG. 5e, the connector having been rotated about its long axis a further 90°.

FIG. 6a shows a perspective view of a sixth embodiment of a connector according to the present invention.

FIG. 6b shows a perspective view of the connector of FIG. 6a, the connector having been rotated 180° about its long axis.

FIG. 6c shows a side view of the connector of FIG. 6a.

FIG. 6d shows a further side view of the connector depicted in FIG. 6c, the connector having been rotated about its long axis 90°.

FIG. 6e shows a further side view of the connector depicted in FIG. 6d, the connector having been rotated about its long axis a further 90°.

FIG. 6f shows a further side view of the connector depicted in FIG. 6e, the connector having been rotated about its long axis a further 90°.

FIG. 8a shows a perspective view of an insert tool for use in installing connectors made according to the present invention.

FIG. 8b shows a further perspective view of the insert tool of FIG. 5a, the device having been rotated 180° about its log axis.

DETAILED DESCRIPTION

Figure 7:
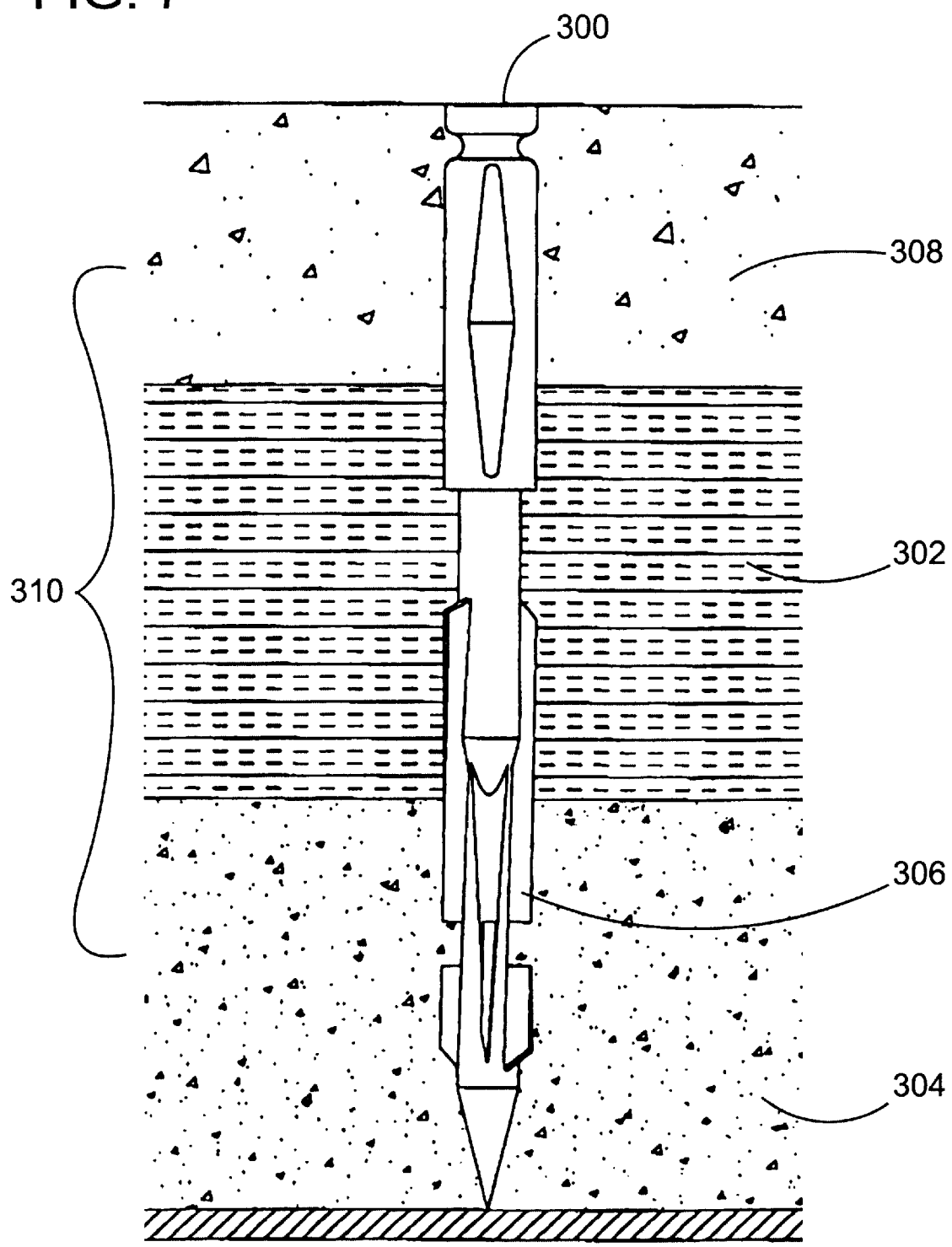
FIG. 7 is a cross-sectional view of a connector according to the present invention in place in a three layer wall section consisting of upper and lower concrete plies and a central insulation ply.

To lower costs in the preparation of pre-cast multi-ply walls using an inner ply of insulating material, it is desirable to make use of common off-the-shelf insulation board which does not require pre-treatment. To make use of such insulating material, a connector is needed which can easily penetrate insulation board while still achieving ready insertion into the first poured concrete layer and still have sufficient strength to hold together a complete three ply wall.

The connector of the present invention is preferably manufactured from plastic materials such as nylon reinforced fiberglass such as the 33% glass filled nylon marketed by ASTIC Materials Co., Inc. The connector of the present invention is preferably manufactured using an injection molding process although any appropriate manufacturing process resulting in the desired connector is suitable. Preferably, the entire connector is of one-piece unitary construction. The selection of plastic material as the medium for construction of the connector is based on plastics having lower coefficients of heat transfer than metals resulting in less heat transfer through the completed wall. Current plastic materials also develop great strengths permitting minimal cross-sections thus minimizing further the heat transfer through the connecting device.

A first connector embodiment I of the connector constructed according to the present invention is seen in FIGS. 1a–1f. Connectors of the present invention are preferably used in creating wall and ceiling three ply panels having a first (or face) concrete layer thickness of about 2–3", an insulation ply layer of a thickness of about 2" to 6" and a second or structural concrete layer having a thickness of about 7–9". Preferably, the connector 1 has a maximum diameter preferably of about 0.35" to 0.40", most preferably about 0.377 inches and a length of about 5.5" to about 6" although these measurements may vary depending upon the type and size of the three ply wall or ceiling panel to be constructed or the thickness of the insulating material used in forming the same.

As illustrated, the first connector 1 includes a first end 3 terminating in a point 5. The point 5 is constructed such that it is of sufficient sharpness to pierce and penetrate insulation board such as board marketed by Dow under the Blueboard tradename or commonly available insulation board marketed by Dow and Owens Corning used in the construction of multi-ply concrete walls. The first end 3 is of sufficient length to transition from point 5 to a cross-sectional diameter suitable for use as the base diameter of the first connector 1. Preferably, the first end is about 0.4" to about 0.5" in length and has a maximum diameter of about 0.2" to about 0.3" and most preferably about 0.262" at the transition point 7 where the first end transitions to the first body segment 9 of the connector.

The first body segment 9 of the connector 1 is designed to engage the first concrete ply and a portion of the insulation board ply. Preferably, for a suitable overall wall thickness of about 11–12", the first body segment 9 is about 1.75" long. The first body segment generally comprises four face areas, which each take up a portion of the circumference of the connector. The face of the first body segment 9 includes a first portion which is followed by a second element followed by a third element followed by a fourth element when traversing around the exterior circumference of the first body segment.

The first portion of the first body segment 9 includes a round rod area having a diameter of about 0.25" from which a first angled fin 13 extends. The first angled fin 13 extends from a first side of the first body segment 9 along the length of the first body segment crossing the body segment at an angle of about 5° off of the long axis of the connector 1 and is tilted at an angle of 4° clockwise off the vertical axis looking down the connector 1 from the direction of the point 5. The first angled fin preferably extends from the first body segment 9 about 0.06" and is about 1.5" in length and 0.04" in width with each terminal end of the straight fin transitioning down through transition portions 15 & 17 to the first body segment 9.

The next circumferential portion of the first body segment includes a first acute angled triangular shaped flat area 19 molded into the face of the first body segment 9 at its end adjacent the transition point 7. The triangular area has a base 21 of a length of about 0.125" and a height of about 0.75" At the first end 23 of the triangular area 19, the flat area is at a level about equal to the outer circumference of the transition point 7. At the second end 21 of the triangular area 19, the flat surface has been cut into the surface of the first body segment 9 about 0.06" creating a first right angle wall area 25. A second acute angled triangular shaped flat area 27 is molded into the face of the first body segment 9 from a point adjacent the first wall area 25 extending along the length of the first body segment 9. This second triangular area 27 is of a size and shape about equal to that of the first triangular shaped flat area 19 creating a sloped wall area 29 similar to that of the first wall area 25.

Traversing further around the circumference of the first body segment 9, a second fin portion includes a second angled fin 11 extending from the first body segment rod. The second angled fin 11 also extends from a first side of the first body segment 9 along the length of the first body segment crossing the body segment at an angle of about 5° off of the long axis of the connector 1 and the fin is tilted at an angle of 4° clockwise off the vertical axis looking down the connector 1 from the direction of the point 5. The second angled fin preferably extends from the first body segment 9 about 0.06" and is about 1.5" in length and 0.04" in width with each terminal end of the straight fin transitioning down through transition portions 15 & 17 to the first body segment 9.

The angular nature of the fins 11 & 13 causes the connector to rotate as it is inserted into and through the insulation layer and into the concrete layer. This rotation permits the insertion of the connector made according to the present invention without the wallowing out of a large hole in the insulation or in the concrete resulting in better anchoring of the plies together and yielding a stronger structure. Further, it is not necessary after installation for the installer to walk over the area where the connector has been inserted to tamp down the concrete to push the still somewhat fluid concrete back into contact with the connector. As the first body segment 9 rotates and passes into the bottom concrete ply, the rotation continues into the concrete creating envelopment and embedment of the connector 1.

Traversing around the final circumferential portion segment of the first body segment 9, a third acute triangular flat area 31 is molded into the face of the first body segment 9. The third acute triangular flat area 31 extends from the transition point 7 to the second sloped area 33. The triangular area has a base 35 of a length of about 0.125" and a height of about 1.375". At the first end 37 of the triangular area 31, the flat area is at a level about equal to the outer circumference of the transition point 7 right angle. At the base 35 of the triangular area 33, the flat surface has been cut into the surface of the first body segment 9 about 0.06" creating the second sloped wall area 33.

The first body segment 9 transitions to a second rod shaped body segment 40. Where an overall panel thickness of about 2" is desired, the second body segment 40 preferably has a length of about 1.5". Preferably, the second body segment 40 has a diameter of about 0.25".

The second body segment 40 transitions to a third body segment 50 at a fourth wall area 52. The third body segment 50 engages the structural concrete ply of the three ply construction. The third body segment 50 preferably has an overall outside diameter of about 0.375" resulting in the fourth wall area 52 extending outward from the termination of the second body segment 40 about 0.06" around the entire circumference of the connector. The third body segment 50 preferably has a length of about 2.0" and includes at least three and preferably four distinct areas.

The first section of the third body segment 50 is the transition area section 54 which forms the third wall area 52. The transition area section 54 preferably has a length of about 0.125". Continuing along the length of the connector 1, the transition area 54 joins to the main body 56 of the third body segment. The main body 56 includes two large acute triangular flat areas molded into its face on opposite sides. The first large triangular flat area 58 is preferably positioned in line along the same axis of the connector as the first and second acute angled triangular shaped flat areas 19 & 27 molded into the face of the first body segment 9. The base 60 of the first large triangular flat area 58 terminates against the transition area section 54 and is inset from the outer diameter of the transition area preferably about 0.125". The first large triangular flat area 58 preferably has a height of about 1.5" and the base preferably has a width of about 0.35", a small amount less than the maximum outer diameter of the connector 1.

Also continuing along the length of the connector 1 from the transition area 54 a second large triangular flat area 64 is preferably positioned in line along the same axis of the connector as the third acute angled triangular shaped flat area 31 molded into the face of the first body segment 9. The base 66 of the first large triangular flat area 64 terminates against the transition area section 54 and is inset from the outer diameter of the transition area preferably about 0.125". The second large triangular flat area 64 preferably has a height of about 1.5" and the base preferably has a width of about 0.35", a small amount less than the maximum outer diameter of the connector 1.

The first and second large triangular flat areas 58 & 64 terminate at a second transition area segment 70. The first and second large triangular flat areas 58 & 64 traverse outward from their inset positions at their bases such that their end points 62 & 68 terminate at the second transition area segment 70 outside diameter which is preferably about 0.375". The second transition area may be formed in one of two ways. First (not shown) the second transition area may simply take the form of a rod preferably having a diameter of about 0.375" and preferably having a length of about 0.25" terminating at the end of the connector 1.

Preferably, however, the transition area includes a structure for use in connection with an insertion device permitting easy use of the connector in the field. This structure permits loading the connector 1 into an insertion device and maintaining the connector in the insertion device until the connector is inserted into the insulation and concrete plies. Preferably, such structure includes a half-round area 80 which connects the second transition area segment 70 to a crown 82. The half round area 80 creates a valley 84 of reduced diameter area. The reduced diameter area preferably has a diameter of about 0.25". The crown then preferably has the full outside diameter of about 0.375". Preferably, the half round area 80 has a length of about 0.125" and preferably the crown 82 has a length of about 0.125.

A second embodiment 100 of the connector constructed according to the present invention is seen in FIGS. 2a–2f. The described preferred measurements are set forth for a three ply panel having a first (or face) concrete layer thickness of about 2–3", an insulation ply layer of a thickness of about 2–6" and a second or structural concrete layer having a thickness of about 7–9". The connector 100 preferably has a maximum diameter of about 0.35" to about 0.4" and most preferably about 0.375 inches and a length of about 5.5" to about 6" and most preferably about 5.533" although these measurements may vary depending upon the type and size of the wall or ceiling to be constructed.

As illustrated, the connector 100 includes a first end 103 terminating in a point 105. The point 105 is constructed such that it is of sufficient sharpness to pierce and penetrate insulation board such as that described above and commonly used in the construction of multi-ply concrete walls. The first end 103 is of sufficient length to transition from point 105 to a cross-sectional diameter suitable for use as the base diameter of the connector 100. Preferably, the first end is about 0.4" to about 0.5" in length and has a maximum diameter of about 0.2" to about 0.3" and most preferably about 0.62" at the transition point 107 where the first end transitions to the first body, segment 109 of the connector.

The first body segment 109 of the connector 100 is designed to engage the first concrete ply and a portion of the insulation ply. Preferably, for a suitable overall wall thickness of about 11–12", the first body segment 109 is about 1.75" long. The first body segment generally comprises four face areas, which each take up a portion of the circumference of the connector. The face of the first body segment 109 includes a first portion which is followed by a second element followed by a third element followed by a fourth element when traversing around the exterior circumference of the first body segment.

The first portion of the first body segment 109 includes a round rod area having a diameter of about 0.25" from which a first angled fin 113 extends. The first angled fin 113 extends from a first side of the first body segment 109 along the length of the first body segment crossing the body segment at an angle of about 5° off of the long axis of the connector 100 and is tilted at an angle of 40 clockwise off the vertical axis looking down the connector 100 from the direction of the point 105. The first angled fin preferably extends from the first body segment 109 about 0.06" and is about 2.25" in length and 0.04" in width with each terminal end of the straight fin transitioning down through transition portions 115 & 117 to the first body segment 109. The fin 113 including its second terminal end 115 extends past the end of the first body segment onto the second body segment 140 of the connector 100.

The next circumferential portion of the first body segment includes a first acute angled triangular shaped flat area 119 molded into the face of the first body segment 109 at its end adjacent the transition point 107. The triangular area has a base 121 of a length of about 0.125" and a height of about 0.75". At the first end 123 of the triangular area 119, the flat area is at a level about equal to the outer circumference of the transition point 107. At the second end 121 of the triangular area 119, the flat surface has been cut into the surface of the first body segment 109 about 0.06" creating a first slanted wall area 125. A second acute angled triangular shaped flat area 127 is molded into the face of the first body segment 109 from a point adjacent the first slanted wall area 125 extending along the length of the first body segment 109. This second triangular area 127 is of a size and shape slightly smaller than that of the first triangular shaped flat area 119 having a preferable height of about 0.5". The base 128 of the second triangular flat area creates a second angular wall area 129 as the flat area intersects the rod shaped first segment 109.

Traversing further around the circumference of the first body segment 109, a second fin portion includes a second angled fin 111 extending from the first body segment rod. The second angled fin 111 also extends from a first side of the first body segment 109 along the length of the first body segment crossing the body segment at an angle of about 5° off of the long axis of the connector 100 and is tilted at an angle of 4° clockwise off the vertical axis looking down the connector 100 from the direction of the point 105. The second angled fin preferably extends from the first body segment 109 about 0.06" and is about 2.25" in length with each terminal end of the straight fin transitioning down through transition portions 115 & 117 to the first body segment 109. The fin 113 including its second terminal end 115 extends past the end of the first body segment onto the second body segment 140 of the connector 100.

The angular nature of the fins 111 & 113 causes the connector to rotate as it is inserted into and through the insulation layer and into the concrete layer. This rotation permits the insertion of the connector made according to the present invention without the wallowing out of a large hole in the insulation or in the concrete resulting in better anchoring of the plies together and yielding a stronger structure. Further, it is not necessary after installation for the installer to walk over the area where the connector has been inserted to tamp down the concrete to push the still somewhat fluid concrete back into contact with the connector. As the first body segment 109 rotates and passes into the bottom concrete ply, the rotation continues into the concrete creating envelopment and embedment of the connector 100.

Traversing around the final circumferential portion of the first body segment 109, a third acute triangular flat area 131 is molded into the face of the first body segment 109. The third acute triangular flat area 131 extends from the transition point 107 to the intersecting wall area 133 created at the intersection of the triangular flat area 131 and the rod shaped first segment 109. The triangular area has a base 135 of a length of about 0.125" and a height of about 1.375". At the first end 137 of the triangular area 131, the flat area is at a level about equal to the outer circumference of the transition point 107. At the base 135 of the triangular area 133, the flat surface has been cut into the surface of the first body segment 109 about 0.06" creating the intersecting wall area 133.

The first body segment 109 transitions to a second body segment 140 through a transition area 141. The second body segment is rod shaped. For an overall panel thickness of about 11–12", the second body segment 140 has a length of about 1.5". Preferably, the second body segment 140 has a diameter of about 0.312". As noted in the discussion of the first body segment 109, the fins 111 and 113 extend through a first sloped area 151 into a right angle onto the surface of the rod shaped second body segment 140. Preferably, about one-half of the length of the second body segment 140 is finned and about one-half is finless.

The second body segment 140 transitions to a third body segment 150 wall area 152. The third body segment 150 engages the structural concrete ply of the three ply construction. The third body segment 150 preferably has an overall outside diameter of about 0.375" resulting in the third wall area 152 extending outward from the termination of the second body segment 140 about 0.033" around the entire circumference of the connector from the first sloped area 151. The third body segment 150 preferably has a length of about 2.0" where the desired overall panel thickness is about 11–12".

Beginning adjacent the right angle wall area 152, the main body 156 of the third body segment includes four acute triangular flat areas molded into its face, two each on opposite sides. The first triangular flat area 158 is preferably positioned in line along the same axis of the connector as the first and second acute angled triangular shaped flat areas 119 & 127 molded into the face of the first body segment 109. The base 160 of the first triangular flat area 158 forms a common base for the second triangular flat area 159. The base is inset from the outer diameter of the third body segment 150 preferably about 0.625". The first and second triangular flat areas 158 and 159 each preferably have a height of about 0.75" and the base preferably has a width of about 0.25", a small amount less than the maximum outer diameter of the connector 100.

Also along the length of the connector 100 are third and fourth triangular flat areas 164 and 165 which are preferably positioned in line along the same axis of the connector as the third acute angled triangular shaped flat area 131 molded into the face of the first body segment 109. Beginning adjacent the right angle wall area 152, the third triangular flat area 164 extends lengthwise to a base 116 which forms a common base with the fourth acute triangular area 165. The base 165 is inset from the outer diameter of the third body segment 150 preferably about 0.625". The third and fourth triangular flat areas 164 and 165 each preferably have a height of about 0.75" and the base preferably has a width of about 0.25", a small amount less than the maximum outer diameter of the connector 100.

The second and fourth triangular flat areas 159 & 165 terminate at a second transition area segment 170. The second and fourth triangular flat areas 159 & 165 traverse outward from their inset positions at their bases 160 and 166 such that their end points 162 & 168 terminate at the second transition area segment 170. The second transition area may be formed in one of two ways. First (not shown) the second transition area may simply take the form of a rod preferably having a diameter of about 0.375" and preferably having a length of about 0.25" terminating at the end of the connector 100.

Preferably, however, the transition area includes a structure for use in connection with an insertion device permitting easy use of the connector in the field. This structure permits loading the connector 100 into an insertion device and maintaining the connector in the insertion device until the connector is inserted into the insulation and concrete plies. Preferably, such structure includes a half-round area 180 which connects the second transition area segment 170 to a crown 182. The half round area 180 creates a valley 184 of reduced diameter area. The reduced diameter area preferably has a diameter of about 0.25". The crown then preferably has the full outside diameter of about 0.375". Preferably, the half round area 180 has a length of about 0.125" and preferably the crown 182 has a length of about 0.125".

A third embodiment 200 of the connector constructed according to the present invention is seen in FIGS. 3a–3f. The described preferred measurements are set forth for a three ply panel having a first (or face) concrete layer thickness of about 2–3", an insulation ply layer of a thickness of about 2–6" and a second or structural concrete layer having a thickness of about 7–9". The connector 200 preferably has a maximum diameter of about 0.377 inches and a length of about 5.5" to about 6" and most preferably about 5.533" although these measurements may vary depending upon the type and size of the wall or ceiling to be constructed.

As illustrated, the third connector 200 includes a first end 203 terminating in a point 205. The point 205 is constructed such that it is of sufficient sharpness to pierce and penetrate insulation board such as described above and commonly used in the construction of multi-ply concrete walls. The first end 203 is of sufficient length to transition from point 205 to a cross-sectional diameter suitable for use as the base diameter of the connector 200. Preferably, the first end is about 0.4" in length and has a maximum diameter of about 0.262" at the transition point 207 where the first end transitions to the first body segment 209 of the connector.

The first body segment 209 of the connector 200 is designed to engage the first concrete ply and a portion of the insulation ply. Preferably, for a suitable overall wall thickness of about 11–12", the first body segment 209 is about 1.613" long. The first body segment generally comprises four face areas, which each take up a portion of the circumference of the connector. The face of the first body segment 209 includes a first portion which is followed by a second element followed by a third element followed by a fourth element when traversing around the exterior circumference of the first body segment.

The first portion of the first body segment 209 includes a round rod area having a diameter of about 0.25" from which a first angled fin 213 extends. The first angled fin 213 extends from a first side of the first body segment 209 along the length of the first body segment crossing the body segment at an angle of about 5° off of the long axis of the connector 200 and is tilted at an angle of 4° clockwise off the vertical axis looking down the connector 200 from the direction of the point 205. The first angled fin 213 preferably extends from the first body segment 209 about 0.057" and is about 2.668" in length and 0.04" in width with each terminal end of the straight fin transitioning down through transition portions 215 & 217 to the first body segment 209. Preferably, the first angled fin 213 is divided into two separate segments, a first fin segment 213a and a second fin segment 213b. The break or deletion of a portion of the first angled fin 213 is provided to the fin 213 including its second terminal end 215 extends past the end of the first body segment 209 onto the second body segment 240 of the connector 200. Preferably, the break 212 eliminates about 0.156" of the fin.

The next circumferential portion of the first body segment includes a first acute angled triangular shaped flat area 219 molded into the face of the first body segment 209 at its end adjacent the transition point 207. The triangular area has a base 221 of a length of about 0.125" and a height of about 0.75". At the first end 223 of the triangular area 219, the flat area is at a level about equal to the outer circumference of the transition point 207. At the second end 221 of the triangular area 219, the flat surface has been cut into the surface of the first body segment 209 about 0.0625" creating a first slanted wall area 225. Molded onto the face of the triangular shaped flat area 219 is a first short fin 220. The first short fin angles across the face of the first triangular shaped flat area 219 at an angle to the axis of the length of the connector 200 about equal to that of the first angled fin 213. The first short fin 220 preferably extends outward from the face of the first triangular shaped flat area 219 about 0.057" and preferably is about 0.625" long and 0.04" in width extending from a sharpened point 222 beginning at the first end 223 of the triangular shaped area 219 and extending generally along one side of the first triangular shaped flat area 219. The first short fin 220 terminates adjacent the first slanted wall area 225 of the first triangular shaped flat area 219.

A second acute angled triangular shaped flat area 227 is molded into the face of the first body segment 209 from a point adjacent the first slanted wall area 225 extending along the length of the first body segment 209. This second triangular area 227 is of a size and shape slightly smaller than that of the first triangular shaped flat area 219 having a preferable height of about 0.5". The base 228 of the second triangular flat area creates a second angular wall area 229 as the flat area intersects the rod shaped first segment 209.

Traversing further around the circumference of the first body segment 209, a second fin portion includes a second angled fin 211 extending from the first body segment rod. The second angled fin 211 also extends from a first side of the first body segment 209 along the length of the first body segment crossing the body segment at an angle of about 5° off of the long axis of the connector 200 and is tilted at an angle of 4° clockwise off the vertical axis looking down the connector 200 from the direction of the point 205. The second angled fin preferably extends from the first body segment 209 about 0.057° and is about 2.668" in length and about 0.04" in width with each terminal end of the straight fin transitioning down through transition portions 215 & 217 to the first body segment 209. Preferably, the first angled fin 211 is divided into two separate segments, a first fin segment 211a and a second fin segment 211b. The break or deletion of a portion of the first angled fin 211 is provided to the fin 211 including its second terminal end 215 extends past the end of the first body segment 209 onto the second body segment 240 of the connector 200. Preferably, the break 212 eliminates about 0.1560" of the fin. The fin 213 including its second terminal end 215 extends past the end of the first body segment onto the second body segment 240 of the connector 200.

Traversing around the final circumferential portion of the first body segment 209, a third acute triangular flat area 231 is molded into the face of the first body segment 209. The third acute triangular flat area 231 extends from adjacent the transition point 207 to the intersecting wall area 233 created at the intersection of the triangular flat area 231 and the rod shaped first segment 209. The triangular area has a base 235 of a length of about 0.125" and a height of about 1.375". At the first end 237 of the triangular area 231, the flat area is at a level about equal to the outer circumference of the transition point 207. At the base 235 of the triangular area 233, the flat surface has been cut into the surface of the first body segment 209 about 0.0625" creating the intersecting wall area 233.

Extending from the face of the third acute triangular shaped flat area 231 is a fourth short fin 232 of like shape and angled placement as the first short fin 220. The second short fin 232 preferably extends outward from the face of the third triangular shaped flat area 231 about 0.0625" and preferably is about 0.625" long and 0.04" in width extending from a sharpened point 232a beginning at the first end of the triangular shaped area 219 adjacent the transition point 207 and extending generally along one side of the third triangular shaped flat area 231. The second short fin 232 terminates about mid-way along the length of the third triangular shaped flat area 231.

The angular nature of the fins 211 & 213 and the short fins cause the connector to rotate as it is inserted into and through the insulation layer and into the concrete layer. This rotation permits the insertion of the connector made according to the present invention without the wallowing out of a large hole in the insulation or in the concrete resulting in better anchoring of the plies together and yielding a stronger structure. Further, it is not necessary after installation for the installer to walk over the area where the connector has been inserted to tamp down the concrete to push the still somewhat fluid concrete back into contact with the connector. As the first body segment 209 rotates and passes into the bottom concrete ply, the rotation continues into the concrete creating envelopment and embedment of the connector 200.

The first body segment 209 transitions to a second body segment 240 through a transition area 241. The second body segment is rod shaped. For an overall panel thickness of about 11–12", the second body segment 240 has a length of about 1.5". Preferably, the second body segment 240 has a diameter of about 0.314". As noted in the discussion of the first body segment 209, the fins 211 and 213 extend through a first sloped area 251 into a right angle onto the surface of the rod shaped second body segment 240. Preferably, about one-half of the length of the second body segment 240 is finned and about one-half is finless.

The second body segment 240 transitions to a third body segment 250 wall area 252. The third body segment 250 engages the structural concrete ply of the three ply construction. The third body segment 250 preferably has an overall outside diameter of about 0.377" resulting in the third wall area 252 extending outward from the termination of the second body segment 240 about 0.0325" around the entire circumference of the connector from the first sloped area 251. The third body segment 250 preferably has a length of about 2.012" where the desired overall panel thickness is about 11–12".

Beginning adjacent the right angle wall area 252, the main body 256 of the third body segment includes four acute triangular flat areas molded into its face, two each on opposite sides. The first triangular flat area 258 is preferably positioned in line along the same axis of the connector as the first and second acute angled triangular shaped flat areas 219 & 227 molded into the face of the first body segment 209. The base 260 of the first triangular flat area 258 forms a common base for the second triangular flat area 259. The base is inset from the outer diameter of the third body segment 250 preferably about 0.625". The first and second triangular flat areas 258 and 259 each preferably have a height of about 0.75" and the base preferably has a width of about 0.25", a small amount less than the maximum outer diameter of the connector 200.

Also along the length of the connector 200 are third and fourth triangular flat areas 264 and 265 which are preferably positioned in line along the same axis of the connector as the third acute angled triangular shaped flat area 231 molded into the face of the first body segment 209. Beginning adjacent the right angle wall area 252, the third triangular flat area 264 extends lengthwise to a base 216 which forms a common base with the fourth acute triangular area 265. The base 265 is inset from the outer diameter of the third body segment 250 preferably about 0.625". The third and fourth triangular flat areas 264 and 265 each preferably have a height of about 0.75" and the base preferably has a width of about 0.25", a small amount less than the maximum outer diameter of the connector 200.

The second and fourth triangular flat areas 259 & 265 terminate at a second transition area segment 270. The second and fourth triangular flat areas 259 & 265 traverse outward from their inset positions at their bases 260 and 266 such that their end points 262 & 268 terminate at the second transition area segment 270. The second transition area may be formed in one of two ways. First (not shown) the second transition area may simply take the form of a rod preferably having a diameter of about 0.375" and preferably having a length of about 0.25" terminating at the end of the connector 200.

Preferably, however, the transition area includes a structure for use in connection with an insertion device permitting easy use of the connector in the field. This structure permits loading the connector 200 into an insertion device and maintaining the connector in the insertion device until the connector is inserted into the insulation and concrete plies. Preferably, such structure includes a half-round area 280 which connects the second transition area segment 270 to a crown 282. The half round area 280 creates a valley 284 of reduced diameter area. The reduced diameter area preferably has a diameter of about 0.25. The crown then preferably has the full outside diameter of about 0.377". Preferably, the half round area 280 has a length of about 0.125" and preferably the crown 282 has a length of about 0.125".

A fourth embodiment 500 of the connector constructed according to the present invention is seen in FIGS. 4a–4f. This connector is preferable when greater thickness of insulation ply are desired such as about 1½" to about 4" of insulation. The connector 500 preferably has a maximum diameter of about 0.377 inches and a length of about 7.5" although these measurements may vary depending upon the type and size of the wall or ceiling to be constructed.

As illustrated, the fourth connector 500 includes a first end 503 terminating in a point 505. The point 505 is constructed such that it is of sufficient sharpness to pierce and penetrate insulation board such as described above and commonly used in the construction of multi-ply concrete walls. The first end 503 is of sufficient length to transition from point 505 to a cross-sectional diameter suitable for use as the base diameter of the connector 500. Preferably, the first end is about 0.4" in length and has a maximum diameter of about 0.262" at the transition point 507 where the first end transitions to the first body segment 509 of the connector.

The first body segment 509 of the connector 500 is designed to engage the first concrete ply and a portion of the insulation ply. Preferably, for a suitable overall wall thickness of about 11–12", the first body segment 509 is about 1.613" long. The first body segment generally comprises four face areas. The face areas of the first body segment 509 include a first element followed by a second element followed by a third element followed by a fourth element when traversing around the exterior circumference of the first body segment.

The first circumferential portion of the first body segment 509 includes a round rod area having a diameter of about 0.262" from which a first angled fin 513 extends. The first angled fin 513 extends from a first side of the first body segment 509 along the length of the first body segment crossing the body segment at an angle of about 5° off of the long axis of the connector 500 and is tilted at an angle of 4° clockwise off the vertical axis looking down the connector 500 from the direction of the point 505. The first angled fin 513 preferably extends from the first body segment 509 about 0.057" and is about 2.668" in length and 0.04" in width with each terminal end of the straight fin transitioning down through transition portions 515 & 517 to the first body segment 509. Preferably, the first angled fin 513 is divided into two separate segments, a first fin segment 513a and a second fin segment 513b. The break or deletion of a portion of the first angled fin 513 is provided to the fin 513 including its second terminal end 515 extends past the end of the first body segment 509 onto the second body segment 540 of the connector 500. Preferably, the break 512 eliminates about 0.156" of the fin.

The second circumferential portion of the first body segment includes a first acute angled triangular shaped flat area 519 molded into the face of the first body segment 509 at its end adjacent the transition point 507. The triangular area has a base 521 of a length of about 0.125" and a height of about 0.75". At the first end 523 of the triangular area 519, the flat area is at a level about equal to the outer circumference of the transition point 507. At the second end 521 of the triangular area 519, the flat surface has been cut into the surface of the first body segment 509 about 0.0625" creating a first slanted wall area 525. Molded onto the face of the triangular shaped flat area 519 is a first short fin 520. The first short fin angles across the face of the first triangular shaped flat area 519 at an angle to the axis of the length of the connector 500 about equal to that of the first angled fin 513. The first short fin 520 preferably extends outward from the face of the first triangular shaped flat area 519 about 0.057" and preferably is about 0.625" long and 0.04" in width extending from a sharpened point 522 beginning at the first end 523 of the triangular shaped area 519 and extending generally along one side of the first triangular shaped flat area 519. The first short fin 520 terminates adjacent the first slanted wall area 525 of the first triangular shaped flat area 519.

A second acute angled triangular shaped flat area 527 is molded into the face of the first body segment 509 from a point adjacent the first slanted wall area 525 extending along the length of the first body segment 509. This second triangular area 527 is of a size and shape slightly smaller than that of the first triangular shaped flat area 519 having a preferable height of about 0.5". The base 528 of the second triangular flat area creates a second angular wall area 529 as the flat area intersects the rod shaped first segment 509.

Traversing further around the circumference of the first body segment 509, a third circumferential portion includes a second angled fin 511 extending from the first body segment rod. The second angled fin 511 also extends from a first side of the first body segment 509 along the length of the first body segment crossing the body segment at an angle of about 5° off of the long axis of the connector 500 and is tilted at an angle of 4° clockwise off the vertical axis looking down the connector 500 from the direction of the point 505. The second angled fin preferably extends from the first body segment 509 about 0.057° and is about 2.668° in length and about 0.04° in width with each terminal end of the straight fin transitioning down through transition portions 515 & 517 to the first body segment 509. Preferably, the first angled fin 511 is divided into two separate segments, a first fin segment 511a and a second fin segment 511b. The break or deletion of a portion of the first angled fin 511 is provided to the fin 511 including its second terminal end 515 extends past the end of the first body segment 509 onto the second body segment 540 of the connector 500. Preferably, the break 512 eliminates about 0.156" of the fin. The fin 513 including its second terminal end 515 extends past the end of the first body segment onto the second body segment 540 of the connector 500.

Traversing around the final portion segment of the first body segment 509, a third acute triangular flat area 531 is molded into the face of the first body segment 509. The third acute triangular flat area 531 extends from adjacent the transition point 507 to the intersecting wall area 533 created at the intersection of the triangular flat area 531 and the rod shaped first segment 509. The triangular area has a base 535 of a length of about 0.125" and a height of about 1.375". At the first end 537 of the triangular area 531, the flat area is at a level about equal to the outer circumference of the transition point 507. At the base 535 of the triangular area 533, the flat surface has been cut into the surface of the first body segment 509 about 0.0625" creating the intersecting wall area 533.

Extending from the face of the third acute triangular shaped flat area 531 is a fourth short fin 532 of like shape and angled placement as the first short fin 520. The second short fin 532 preferably extends outward from the face of the third triangular shaped flat area 531 about 0.057" and preferably is about 0.625" long and about 0.04" in width extending from a sharpened point 532a beginning at the first end of the triangular shaped area 519 adjacent the transition point 507 and extending generally along one side of the third triangular shaped flat area 531. The second short fin 532 terminates about mid-way along the length of the third triangular shaped flat area 531.

The angular nature of the fins 511 & 513 and the short fins cause the connector to rotate as it is inserted into and through the insulation layer and into the concrete layer. This rotation permits the insertion of the connector made according to the present invention without the wallowing out of a large hole in the insulation or in the concrete resulting in better anchoring of the plies together and yielding a stronger structure. Further, it is not necessary after installation for the installer to walk over the area where the connector has been inserted to tamp down the concrete to push the still somewhat fluid concrete back into contact with the connector. As the first body segment 509 rotates and passes into the bottom concrete ply, the rotation continues into the concrete creating envelopment and embedment of the connector 500.

The first body segment 509 transitions to a second body segment 540 through a transition area 541. The second body segment is rod shaped. For an overall panel thickness of about 11–12", the second body segment 540 has a length of about 3.5". Preferably, the second body segment 540 has a diameter of about 0.314". As noted in the discussion of the first body segment 509, the fins 511 and 513 extend through a first sloped area 551 into a right angle onto the surface of the rod shaped second body segment 540. Preferably, the second body segment 540 has a second pair of angled fins 518 and 524 which begin about 1.25" from the first body segment 509. Each fin of the second pair is located on opposite sides of the connector 500. The second pair of fins 518 and 524 begin on about the same longitudinal axis as the corresponding first angled fins 511 and 513. Also, the second pair of angled fins 518 and 524 slope across the longitudinal axis and tilt along the vertical axis at about the same angles as the corresponding first pair of angled fins 511 and 513 and extend from the second body segment 540 about the same length. The second pair of fins 518 and 524 are about 2" long and do not contain any breaks. Preferably, about one-half of the length of the second body segment 540 is finned and about one-half is finless.

The second body segment 540 transitions to a third body segment 550 wall area 552. The third body segment 550 engages the structural concrete ply of the three ply construction. The third body segment 550 preferably has an overall outside diameter of about 0.377" resulting in the third wall area 552 extending outward from the termination of the second body segment 540 about 0.0325" around the entire circumference of the connector from the first sloped area 551. The third body segment 550 preferably has a length of about 2.012" where the desired overall panel thickness is about 11–12".

Beginning adjacent the right angle wall area 552, the main body 556 of the third body segment includes four acute triangular flat areas molded into its face, two each on opposite sides. The first triangular flat area 558 is preferably positioned in line along the same axis of the connector as the first and second acute angled triangular shaped flat areas 519 & 527 molded into the face of the first body segment 509. The base 560 of the first triangular flat area 558 forms a common base for the second triangular flat area 559. The base is inset from the outer diameter of the third body segment 550 preferably about 0.625". The first and second triangular flat areas 558 and 559 each preferably have a height of about 0.75" and the base preferably has a width of about 0.25", a small amount less than the maximum outer diameter of the connector 500.

Also along the length of the connector 500 are third and fourth triangular flat areas 564 and 565 which are preferably positioned in line along the same axis of the connector as the third acute angled triangular shaped flat area 531 molded into the face of the first body segment 509. Beginning adjacent the right angle wall area 552, the third triangular flat area 564 extends lengthwise to a base 516 which forms a common base with the fourth acute triangular area 565. The base 565 is inset from the outer diameter of the third body segment 550 preferably about 0.625". The third and fourth triangular flat areas 564 and 565 each preferably have a height of about 0.75" and the base preferably has a width of about 0.25", a small amount less than the maximum outer diameter of the connector 500.

The second and fourth triangular flat areas 559 & 565 terminate at a second transition area segment 570. The second and fourth triangular flat areas 559 & 565 traverse outward from their inset positions at their bases 560 and 566 such that their end points 562 & 568 terminate at the second transition area segment 570. The second transition area may be formed in one of two ways. First (not shown) the second transition area may simply take the form of a rod preferably having a diameter of about 0.375" and preferably having a length of about 0.25" terminating at the end of the connector 500.

Preferably, however, the transition area includes a structure for use in connection with an insertion device permitting easy use of the connector in the field. This structure permits loading the connector 500 into an insertion device and maintaining the connector in the insertion device until the connector is inserted into the insulation and concrete plies. Preferably, such structure includes a half-round area 580 which connects the second transition area segment 570 to a crown 582. The half round area 580 creates a valley 584 of reduced diameter area. The reduced diameter area preferably has a diameter of about 0.25". The crown then preferably has the full outside diameter of about 0.377". Preferably, the half round area 580 has a length of about 0.125" and preferably the crown 582 has a length of about 0.125".

A fifth embodiment 600 of the connector constructed according to the present invention is seen in FIGS. 5a–5f. This embodiment is identical to that of FIGS. 3a–f except that each of the fins has been removed. In this embodiment, while the rotating fins have been removed many of the features such as ease of insertion, penetration through any smooth un-prepared insulation board and firm embedment of the anchoring ends in the concrete plies is achieved.

A sixth embodiment 700 of the connector constructed according to the present invention is seen in FIGS. 6a–f. This embodiment is identical to that of FIGS. 3a–f except that each of the fins has been removed except for the four short fins near the pointed end such that the connector presents a barbed shape.

In these fifth and sixth embodiments, while the rotating fins have been removed many of the features such as ease of insertion, penetration through any smooth un-prepared insulation board and firm embedment of the anchoring ends in the concrete plies is achieved.

The barbed end and/or deformed projections for embedment in the outer architectural face ply and the deformed upper portion for embedment in the structural ply remain. The one feature that contrasts with the original design is the lack of an agitating method so that the liquid or plastic concrete can envelope the device at the penetrating end. By removing the spiral vanes the unit no longer is forced to rotate into the wet concrete and force or flow the concrete material into the deformations to create anchorage. The ability of the connector to create its own entrance into the insulating foam board without benefit of a pre-drilled or pre-formed opening remains. Methods of insertion and the tools used are unchanged. The same selectivity of location for enhancement of the ability to carry specific loads is unchanged.

However, where the rotating fins are removed, preferably an alternate methodology must be employed to create envelopment of the penetrating end for anchorage in the liquid concrete face ply. This can be accomplished by several means. First, the workman's weight will cause lateral displacement of the wet concrete as he walks and maneuvers about the insulation board while installing the connector. This will force material into the deformations at the penetrating portion. Secondly, vibratory machines may be applied to the insulation board surface to agitate the liquid concrete, thus replacing the agitation originally provided by the connectors rotating vanes no longer present.

The connector made according to the present inventions is readily usable as a connector for construction of three ply wall and ceiling panels. Because of the simple shape and consistent cross-section of the connectors of the present invention, the connector may be machine fed as well as hand inserted into position, thus eliminating the labor intensive aspects of other systems. As seen in FIG. 7, a connector made according to the present invention is simply inserted with sufficient force to penetrate the insulation layer 302 and force the connector through the insulation and into the first concrete ply 304 to the appropriate depth while maintaining a loose control of the connector permitting rotation of the connector during insertion. The sharpness of the connector results in a smooth penetrating entry which does not force a plug of insulating material into the face concrete ply. Using such technique, where fins 306 are included in the connector of the invention, the connector rotates as it is driven into position through the insulating board 302 into the wet lower first concrete ply 304. A second generally structural layer of concrete 308 is then poured over the insulation layer 302 and just covering the connector 300 to form the desired three ply panel 310.

To insert the connector of the present invention, the connector is simply placed vertically over the point of insertion and forced into and through the insulation layer 302 and then into the first concrete ply 304 by a vertical downward load. Where fins are incorporated in the connector of the present invention, the rotation of the connector agitates the wet concrete and forces concrete into the retention voids and around the rotating fins. Because of the method of vertical insertion to its full depth by a vertical force, and no other required action, the insertion results are consistent from one placement to the next.

Given the piercing nature of the connectors of the present invention, the insulation layer used in constructing a three ply wall or ceiling panel is preferably continuous in nature without predrilled or otherwise formed holes through which the connector may be inserted. Since there is no need for pre-located holes in the insulation layer, the connectors of the present invention may be located in various patterns as dictated by the loading on the particular panel rather than in some preconceived location. Further, no elaborate plan for the spacing of pre-drilled insulation panels is necessary. The insulation panels to be used with the connectors of the present invention may be taken in any order from their storage location and placed on the first wet concrete ply in any scheme suitable to minimize the amount of insulating material needed.

Preferably, the connectors of the present invention are inserted into and through the insulation layer and into the concrete layer using the insert tool as seen in FIGS. 8a & b. The insertion tool 400 includes a handle 402 of any suitable shape for easy gripping by a person's hand. The handle is connected to a long tube or rod 404 of suitable length to enable a workman to insert the connectors of the present invention without requiring undue bending motion or other back strain. Preferably, the insert device has an overall length of about 32". The insert tool 400 terminates at a flanged area 408 similar to that used on ski poles and the like to present a large surface area to the insulation layer and prevent breaking and penetration of the insulation layer by the insert tool during normal operation. The insertion end 406 of the rod or tube 404 is hollow and of a diameter slightly larger than the maximum outside diameter of the connector of the present invention permitting insertion of the connector into the hollow insertion end. The hollow area of the insertion end 406 extends into the insert device to a depth suitable for the desired thickness of concrete and insulation plies. Generally, the portion of the connector which will extend into the insert tool is that portion which will reside in the structural concrete or second concrete ply. The portion of the connector that will ultimately reside within the insulation and first concrete ply will extend out of the end of the insert device 400.

Figure 9:
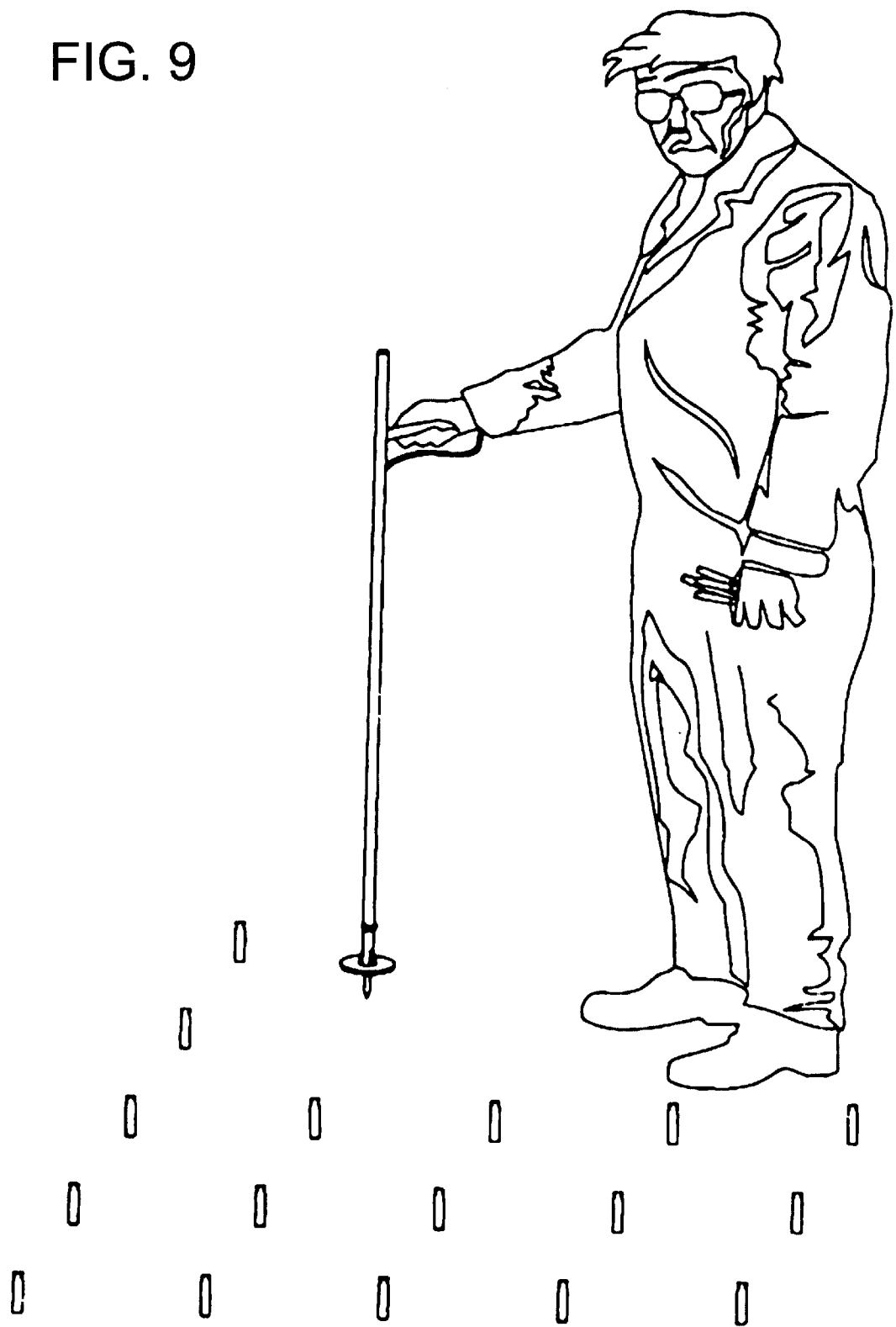
FIG. 9 shows the insertion of a connector according to the present invention using the insert device of FIGS. 5a & b.

A spaced distance above the flanged area 408, structure is included for releasably gripping a connector placed into the insert tool to hold the connector within the tool while the insert tool is pointed downward towards the installation point but prior to actual insertion. Preferably, this structure includes a hole through the insert tool. A spring is then placed around the hole which can then grip the half-round area 80, 180, 280 which connects the second transition area segment 70, 170, 270 to the crown 82, 182, 282 of the connector device made according to the present invention. In this manner, the connector is loosely held in the insert device while still allowing the connector to rotate during insertion into the first insulation layer and the first concrete ply. Easily seen in FIG. 9 is the operation of the insert tool by a workman.

Various additional modifications of the embodiments specifically illustrated and described herein will be apparent to those skilled in the art, particularly in light of the teachings of this invention. The invention should not be construed as limited to the specific forms shown and described, but instead is set forth in the following claims.

What is claimed is:

1. A connector for use in forming a three ply panel having a first concrete layer, and insulation layer, and a second concrete layer, said connector comprising a generally rod-shaped member having at least one angular fin extending from said rod-shaped member causing said connector to rotate during insertion of said connector into the insulation layer and the first concrete layer, said connector comprising glass filled nylon and having a first pointed end having sufficient sharpness to permit perforation of insulation board without the separation and displacement of an insulation plug.

2. A connector for use in forming a three ply concrete-insulation-concrete panel, said connector comprising a generally rod-shaped member having a first end forming a sharpened point, a first body segment including four circumferentially spaced angled fins, a second body segment including at least two circumferentially spaced angled fins, and a third body segment having at least two circumferentially spaced flat segments.

3. The connector according to claim 2, wherein said second body segment includes four circumferentially spaced angled fins.

4. The connector according to claim 2, wherein said connector comprises glass filled nylon.

* * * * *